US008068866B2

(12) United States Patent
Isobe et al.

(10) Patent No.: US 8,068,866 B2
(45) Date of Patent: Nov. 29, 2011

(54) GROUP COMMUNICATION SERVER

(75) Inventors: Shin-ichi Isobe, Yokosuka (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 825 days.

(21) Appl. No.: 11/757,638

(22) Filed: Jun. 4, 2007

(65) Prior Publication Data
US 2007/0281724 A1 Dec. 6, 2007

(30) Foreign Application Priority Data

Jun. 6, 2006 (JP) .................... P2006-157555

(51) Int. Cl.
*H04B 7/00* (2006.01)
(52) U.S. Cl. ........ 455/519; 455/518; 455/520; 455/90.2
(58) Field of Classification Search .......... 455/517–520, 455/90.2, 78, 79, 500, 426.1, 422.1, 416, 455/420, 455, 463, 507; 370/352, 389, 338, 370/328, 260–263, 266, 327
See application file for complete search history.

(56) References Cited

U.S. PATENT DOCUMENTS

| 6,005,848 | A | 12/1999 | Grube et al. |
| 6,480,885 | B1 | 11/2002 | Olivier |
| 7,218,663 | B1 * | 5/2007 | Yokota et al. ................. 375/130 |
| 7,924,987 | B2 * | 4/2011 | Schneider et al. ......... 379/88.25 |
| 2003/0174826 | A1 | 9/2003 | Hesse |
| 2004/0024892 | A1 | 2/2004 | Creswell et al. |
| 2004/0054729 | A1 | 3/2004 | Fukuizumi et al. |
| 2004/0125776 | A1 * | 7/2004 | Haugli et al. ................. 370/338 |
| 2006/0106780 | A1 | 5/2006 | Dagan |
| 2006/0235981 | A1 * | 10/2006 | Westman et al. ............. 709/227 |
| 2007/0050448 | A1 * | 3/2007 | Gonen et al. .................. 709/204 |
| 2007/0233802 | A1 * | 10/2007 | Kulkarni ....................... 709/207 |

FOREIGN PATENT DOCUMENTS

JP 11-196029 7/1999
(Continued)

OTHER PUBLICATIONS

"Open Service Access (OSA)" ETSI Standards, European Telecommunications Standards Institute, Sophia-Antipo, FR, XP014029053 vol. SPAN-12, No. V006, Jun. 2004, pp. 1-47.

(Continued)

*Primary Examiner* — Dominic E Rego
(74) *Attorney, Agent, or Firm* — Oblon, Spivak, McClelland, Maier & Neustadt, L.L.P.

(57) ABSTRACT

It is an object of the present invention to ensure readily communication between subgroups with reduced trouble to the user in the group communication in terms of subgroup formation and so on. A group communication server according to an embodiment of the present invention provides terminals with an intercommunication function between a plurality of terminals belonging to the same group, specifically a group communication function. The group communication server comprises a group information database for storing subgroup information that specifies terminals belonging to subgroups comprising a plurality of terminals of the terminals belonging to the group, and timing information that indicates a timing for establishing connection for intercommunication between the terminals belonging to these subgroups, and a group management unit and connection control unit which constitute control means for executing a control to establish connection between the terminals belonging to the subgroups specified by the subgroup information at a timing specified by the timing information stored in the group information database.

7 Claims, 7 Drawing Sheets

FOREIGN PATENT DOCUMENTS

| | | |
|---|---|---|
| JP | 2001-522161 | 11/2001 |
| JP | 2002-237775 | 8/2002 |
| JP | 2003-023418 | 1/2003 |
| JP | 2004-102547 | 4/2004 |
| JP | 2004-108835 | 4/2004 |
| JP | 2005-117337 | 4/2005 |
| JP | 2006-119885 | 5/2006 |
| KR | 2003-0004876 | 1/2003 |
| KR | 10-2005-0000714 | 1/2005 |

OTHER PUBLICATIONS

"Technical Specification Group Services and System Aspects; IP Multimedia Subsystem (IMS)" $3^{rd}$ Generation Partnership Project, 3GPP TS 23.228 V8.0.0, Stage 2, Release 8, Mar. 2007, 224 pages.

Decision to refuse a European Patent Application issued May 6, 2011, in European Patent Application No. 07 011 054.9.

Provision of the minutes issued Apr. 27, 2011, in European Patent Application No. 07 011 054.9.

Oral Proceedings issued Apr. 12, 2011, in European Patent Application No. 07 011 054.9.

Office Action issued Jan. 13, 2011, in European Patent Application No. 07011054.9.

Office Action issued Mar. 17, 2011, in Taiwan Patent Application No. 096120172 (with English translation).

Office Action (with English translation) issued on Jul. 21, 2011, in counterpart Taiwanese Patent Application No. 096120172 (10 pages).

* cited by examiner

Fig.3

GROUP ID: 1

NUMBER OF PARTICIPANTS: 6

TERMINAL ID: A, B, C, D, E, F

START TIME: 19:00

CONNECTION MODE: CONFERENCE TYPE

*Fig.5*

SCHEDULE

19:00 START COMMUNICATION
 |   CONFERENCE TYPE
19:40
 |   1 TO 1 TYPE
20:30
 |   3-PERSON GROUP TYPE
20:45
 |   CONFERENCE TYPE
21:00 END COMMUNICATION

GROUP COMMUNICATION SERVER

BACKGROUND OF THE INVENTION

1. Field of the Invention

The present invention relates to a group communication server for providing a group communication function to a terminal.

2. Related Background Art

An IP Multimedia Subsystem (IMS) represents a solution for actualizing a communication service performed by a conventional fixed phone, mobile communications and broadcasting and so on utilizing an IP (Internet Protocol). This is described in, for example, 3GPP TS 23.228, Technical Specification Group Services and System Aspects; IP Multimedia Subsystem. Using an IMS, audio telephones and TV telephones can be provided in an IP network.

Utilizing the IMS allows for intercommunication (so-called group communication) in a group configured from a plurality of terminals of, for example, audio telephones, TV telephones and telephone conferencing systems. A system in which intercommunication is performed in a group such as this and that allows for intercommunication between subgroups configured from several terminals only of the plurality of terminals from which the group is configured has been previously proposed. The content thereof is described in Japanese Laid-Open Patent Application No. H11-196029.

SUMMARY OF THE INVENTION

However, in the system described in Japanese Laid-Open Patent Application No. H11-196029, because subgroups are formed, initiation of intercommunication between the subgroups requires that a subgroup ID for performing group communication be requested of a parent device. This request is normally executed using an operation performed by the user as a trigger. Accordingly, a user is required to perform this operation on each occasion of formation of a subgroup or alteration to the terminals belonging to a subgroup and so on.

It is an object of the present invention to provide a group communication server in which, resolving the problems described above, communication between subgroups can be readily actualized with reduced trouble to the user in terms of subgroup formation and so on.

The group communication server pertaining to the present invention for attaining this object constitutes a group communication server for providing a terminal with an intercommunication function between a plurality of terminals belonging to the same group comprising: a group information database for storing subgroup information that specifies terminals belonging to subgroups comprising a plurality of terminals of the terminals belonging to the group, and timing information that indicates a timing for establishing connection for intercommunication between the terminals belonging to these subgroups; and control means for executing a control to establish connection between the terminals belonging to the subgroups specified by the subgroup information at a timing specified by the timing information stored in the group information database.

In the group communication server pertaining to the present invention, connection between the terminals belonging to the subgroups is controlled on the basis of the information stored in the group information database. That is to say, the need for a user operation for the formation of a subgroup or the alteration to the terminals belonging to a subgroup is eliminated. Accordingly, based on the group communication server pertaining to the present invention, communication between subgroups can be readily actualized with reduced trouble to the user in terms of subgroup formation and so on.

The group communication server desirably further comprises registration means for receiving input of the subgroup information and the timing information and registering the two information items in the group information database. Based on this architecture, a user can register subgroups and timings in advance affording, as a result, improved convenience of group communication.

The group communication server desirably further comprises determination means for determining the terminals belonging to the subgroups by receiving input of mode information that indicates the number of subgroups and the number of terminals belonging to the subgroups, and registering this determined information in the group information database as subgroup information. Based on this architecture, because the need for a user operation to specify the terminals belonging to a subgroup is eliminated, communication between subgroups can be readily actualized with the trouble to the user even further reduced.

The group information database desirably further stores information that indicates the attributes of the terminals, determination means, referring to the attributes of the terminals, determining the terminals belonging to the subgroups on the basis of rules set in advance. Based on this architecture, more appropriate subgroups can be established.

The subgroup information desirably constitutes information in which a terminal ID that specifies a terminal is associated with a subgroup ID that specifies a subgroup, and the group information database stores a group ID that specifies the group in association with the subgroup ID. Accordingly, based on this architecture, processing involving restoration to whole group communication following subgroup communication can be readily implemented.

Because, in the present invention, connection between terminals belonging to the subgroups is controlled on the basis of information described in the group communication database, the need for a user operation for the formation of a subgroup or the alteration to the terminals belonging to a subgroup is eliminated. Accordingly, communication between subgroups can be readily actualized with reduced trouble to the user in terms of subgroup formation and so on.

BRIEF DESCRIPTION OF THE DRAWINGS

FIG. 3 illustrates an example of group information stored in a group information database of the group communication server;

FIG. 5 is an example of timing information (schedule) stored in the group information database of the group communication server;

DESCRIPTION OF THE PREFERRED EMBODIMENTS

A preferred embodiment of a group communication server pertaining to the present invention will be hereinafter described in detail with reference to the drawings. Identical symbols have been assigned to identical elements of the description of the drawings and, accordingly, a replication of this description has been omitted.

Figure 1:
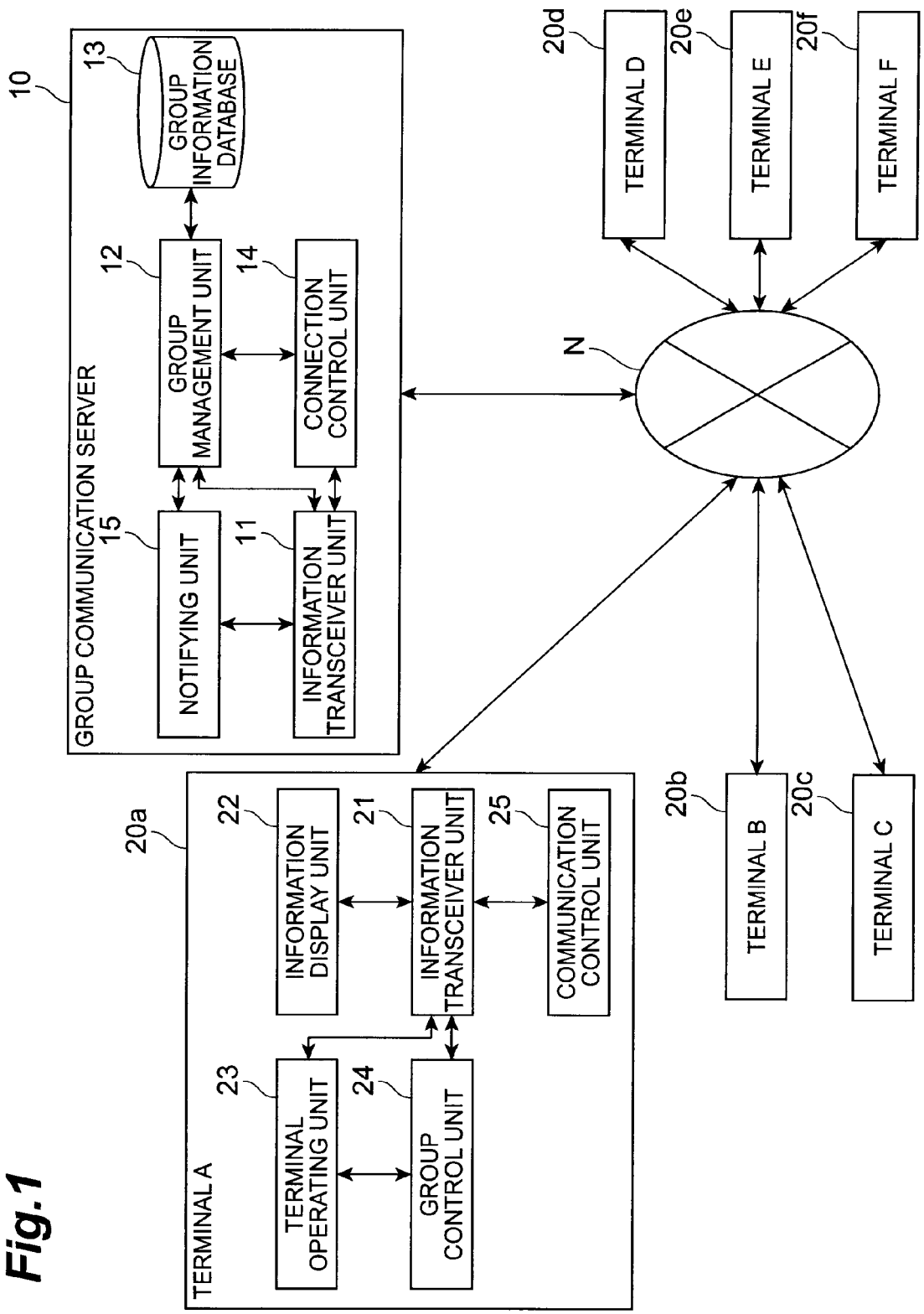
FIG. 1 is a diagram showing the architecture of a group communication server of an embodiment of the present invention, and the architecture of a communication system comprising this group communication server.

FIG. 1 shows a communication system comprising a group communication server 10 pertaining to this embodiment. The communication system comprises a mobile communication network N and the group communication server 10 and plurality of terminals 20 (generic reference to terminals 20a to 20f) connected to the mobile communication network N. The group communication server 10 provides a so-called group communication function to the terminals 20. Group communication refers to intercommunication between a plurality of terminals 20 belonging to a same group only. Group communication is performed subsequent to connection being established between the plurality of terminals 20 by way of the mobile communication network N. More specifically, group communication constitutes, for example, a TV telephone communication performed between a plurality of the terminals 20. The terminals 20 belonging to a group may be established in advance and may be dynamically altered. This kind of group communication may be employed to facilitate the communication performed in, for example, not only TV conferencing or the like, but also matchmaking parties.

The mobile communication network N constitutes the subject target for connection of the terminals 20 and provides a mobile communication service for the terminals 20. The mobile communication network N is configured to comprise a switching equipment, a radio control device and a base station (not shown in the drawings) and so on and, more specifically, for example, constitutes a mobile phone network.

Figure 2:
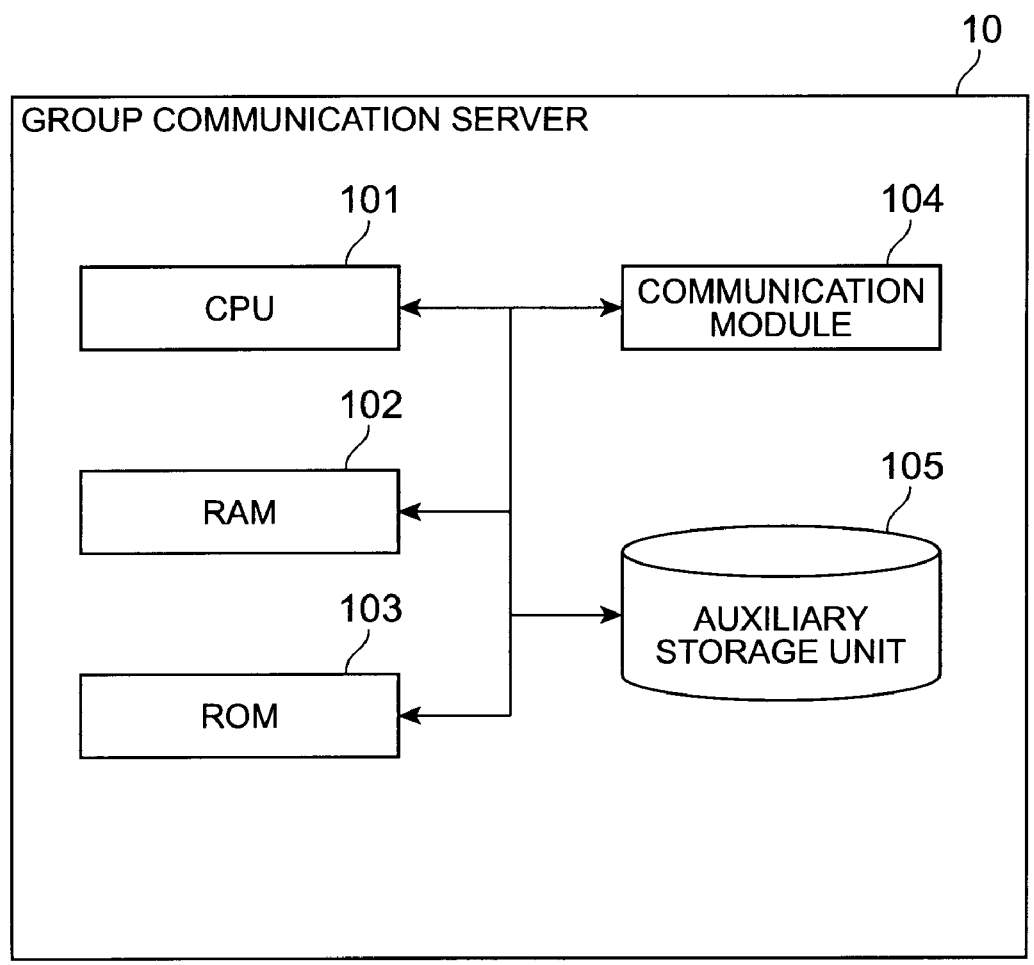
FIG. 2 is a diagram showing the hardware architecture of the group communication server of the embodiment of the present invention.

The group communication server 10 is connected to the mobile communication network N and provides a group communication function to the terminals 20 connected to the mobile communication network N. As shown in FIG. 2, the group communication server 10 is configured as a computer that comprises a CPU (Central Processing Unit) 101, a RAM (Random Access Memory) 102 that serves as a main storage unit and a ROM (Read Only Memory) 103, as well as hardware such as a communication module 104 for performing communication and an auxiliary storage unit 105 such as a hard disk. The later-described functions of the group communication server 10 are demonstrated subsequent to the actuation of these constituent elements.

As shown in FIG. 1, the group communication server 10 is configured to comprise an information transceiver unit 11, a group management unit 12, a group information database 13, a connection control unit 14 and a notifying unit 15.

The information transceiver unit 11 constitutes means for transmitting and receiving information between the terminals 20. Information transmission and reception is performed by way of the mobile communication network N. The specific content of the transmitted and received information will be described later. Transmitted information, as will be described later, is input from the connection control unit 14 or the notifying unit 15 or the like. Received information is output to the group management unit 12 or the like in response to this information.

The group management unit 12 constitutes means for managing the group communication group. More specifically, the group management unit 12, referring to information stored in the group information database 13, executes a supervisory control of the group communication including starting and ending the group communication and switchover to subgroups. That is to say, the group management unit 12 constitutes a constituent element of a control means that, when group intercommunication is performed between terminals 20 belonging to a group, executes a control to establish connection between the terminals 20 belonging to subgroups of this group based on information stored in the group information database 13. The group management unit 12 issues a control command to the connection control unit 14 for connection for group communication, the control itself being executed by the connection control unit 14. The specific content of this control are outlined in the description of the processing of the group communication server 10.

In addition, the group management unit 12 performs a registration in the group information database 13 of group communication information for performing group communication received from the terminals 20. The group communication information contains group information that specifies the plurality of terminals 20 from which the group performing the group communication is configured, subgroup information that specifies the terminals 20 belonging to the subgroups comprising a plurality of terminals 20 of the terminals 20 belonging to the group, and timing information that indicates the timing at which group communication is started and ended and the timing at which connection for intercommunication between the terminals 20 that belong to the subgroups is established. That is to say, the group management unit 12 constitutes registration means for registering input subgroup information and timing information input in the group information database 13. The specific kind of information that this information refers to is outlined in the description of the group information database 13. The information from the terminals 20 is received by way of the information transceiver unit 11.

The subgroup information is not necessarily received from the terminals 20. In this case, as will be described later, the group management unit 12 generates subgroup information and performs a registration thereof in the group information database 13. Here, the group management unit 12 receives subgroup mode information from the terminals 20 and generates subgroups on the basis of this mode information. Subgroup mode information constitutes information that indicates the number of subgroups and the number of terminals belonging to these subgroups. More specifically, this mode information is equivalent to a later-described "connection mode". That is to say, the group management unit 12 constitutes determination means for determining the terminals belonging to the subgroups based on input mode information, and registering this determined information in the group information database 13 as subgroup information. The subgroup generation will be described in more detail later.

In addition, when the group communication information is registered in the group information database 13, the terminals 20 belonging to a group are notified that group communication will be performed (that is to say, that a new group has been registered). The group management unit 12 issues a notification command to the notifying unit 15, the notification itself being executed by the notifying unit 15. The group communication may involve participation of only the terminals 20 from which a response to the above-noted notification that group communication is to be performed has been received. In addition, in conjunction with the above-noted notification, or in response to requests from the terminals 20, information (information that indicates attributes of the users of the terminals 20) such as the name, age, gender, interests and occupation and so on of the users participating in the group communication may be transmitted. The information that indicates the attributes of the users of the terminals 20 is stored in advance in the group information database 13 in association with the information that specifies the terminals 20.

The group information database 13 constitutes a database for storing group communication information. Group communication information is configured to contain group information, subgroup information and timing information. FIG. 3 shows group information that specifies the plurality of terminals 20 from which the group performing the group communication is configured. As shown in FIG. 3, the group information constitutes information in which the "number of participants", "start time", "terminal ID" and "connection mode" are associated with a "group ID". The "group ID" constitutes information that specifies a group and serves as unique information for each group. More specifically, for example, a character line is employed as the "group ID". The "number of participants" constitutes information that indicates the number of individuals participating in the group communication (number of terminals). The "terminal ID" constitutes information that specifies the terminals 20 and serves as unique information for each terminal 20. More specifically, for example, an ID composed of a character line or a phone number assigned to the terminals 20 in advance is employed as the "terminal ID". Because group communication involves participation of a plurality of terminals 20, a plurality of "terminal ID" correspond to a single "group ID". The "start time" constitutes information that indicates the time at which the group communication is started. In addition to time information, this information may include date information.

The "connection mode" constitutes information that indicates the group communication mode. More specifically, this constitutes information that indicates whether or not a subgroup is formed and what mode of subgroup this is. For example, as shown in FIG. 3, if the "connection mode" is a "conference type", the group performing the group communication is performed between all of the terminals 20 (no subgroups are formed). In addition, if the "connection mode" is the later-described "1-to-1 type", subgroups of two terminals 20 each are formed. In addition, if the "connection mode" is a "3-person group type", subgroups of three terminals 20 each are formed. Moreover, apart from the "group ID", the above-noted information constitutes information transmitted from the terminals 20. While the "group ID" may be transmitted from the terminals 20, it may be generated to be unique for each group by the group management unit 12.

Figure 4:
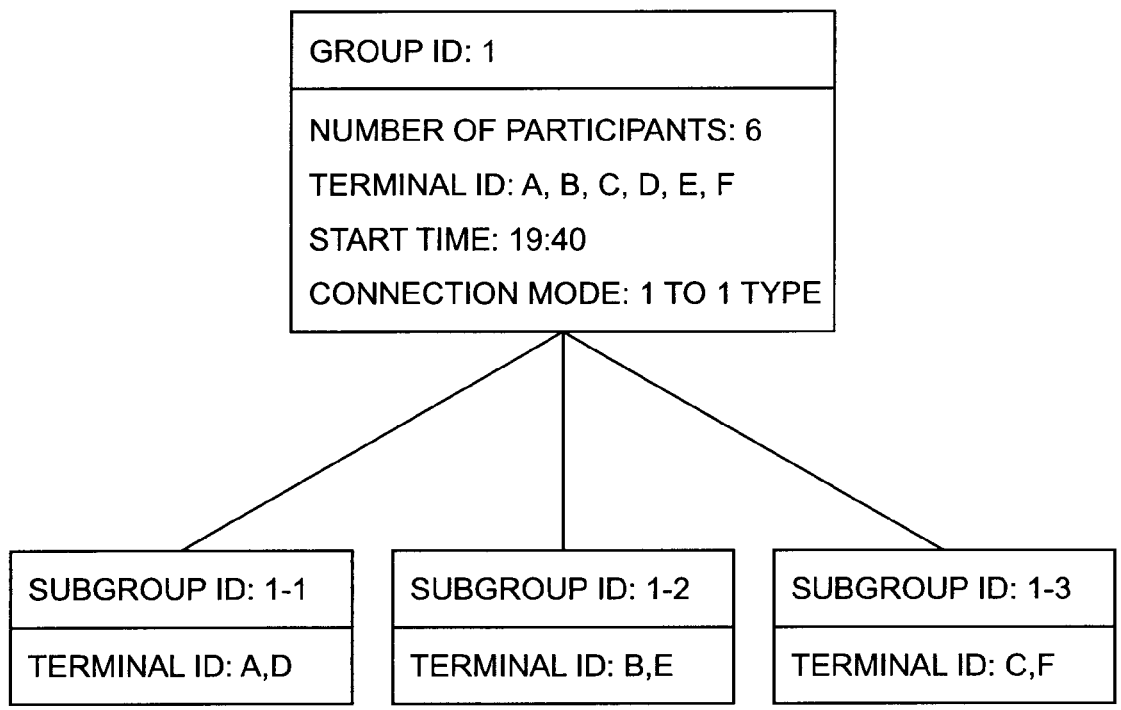
FIG. 4 illustrates an example of group information which is stored in the group information database of the group communication server and which is associated with subgroup information.

When subgroups are formed, as shown in FIG. 4, subgroup information is stored in association with the group information. The subgroup information, as is described above, constitutes information that specifies the terminals 20 belonging to subgroups comprising a plurality of terminals 20 of the terminals 20 belonging to the group. In this embodiment, when subgroups are formed, all the terminals 20 belong to a subgroup. That is to say, subgroups are set in a form based on demarcation of the terminals 20 belonging to the group. As shown in FIG. 4, where the "connection mode" is "1-to-1 type" and the "number of participants" is "6", three subgroups of two terminals 20 each are formed.

As shown in FIG. 4, the subgroup information constitutes information in which the "terminal ID" is associated with the "subgroup ID". The "subgroup ID" constitutes information that specifies the subgroups and serves as unique information for each subgroup. More specifically for example, in the same way as the "group ID", a character line is employed as the "subgroup ID". As is described above, the subgroup information is associated with the group information. More specifically, the subgroup ID is associated with the group ID. By adoption of an information architecture such as this, the processing involved in restoration to whole group communication and so on following subgroup communication can be readily executed. While the "subgroup ID" may be transmitted from the terminals 20, it may be generated to be unique for each subgroup by the group management unit 12. In addition, the subgroup information itself (as one type of group communication information) may be received from the terminals 20 (in this case, the subgroup is set by the user of the terminal 20) and, as will be described later, it may be generated by the group management unit 12.

FIG. 5 shows the timing information stored in the group information database 13. The timing information constitutes information that indicates the timing at which connection for intercommunication between terminals 20 belonging to a subgroup is established when intercommunication is performed between terminals 20 belonging to a group. As shown in FIG. 5, timing information (group communication schedule) comprises information that indicates the timing for communication start and end, and the timing for switchover of the group communication to group communication between subgroups. A judgment of how each group communication (using what kind of group architecture) is performed can be made by referring to the information associated with the group information and subgroup information described above.

According to the example shown in FIGS. 4 and 5, in a group ID1 communication, during the time zone 19:40 to 20:30, 1 to 1 communication is performed between terminals 20a to 20f which belong in the group and specified by terminal ID of "A", "B", "C", "D", "E" and "F" respectively. As shown in FIG. 4, group communication is performed between the subgroup of terminal 20a of terminal ID "A" and terminal 20d of terminal ID "D", the subgroup of terminal 20b of terminal ID "B" and terminal 20e of terminal ID "E", and the subgroup terminal 20c of terminal ID "C" and terminal 20f of terminal ID "F" respectively.

The connection control unit 14 constitutes means for controlling the connection between the terminals 20 for group communication based on receipt of a command from the group management unit 12. That is to say, the connection control unit 14 constitutes a constituent element of control means for establishing connection between terminals 20 belonging to predetermined subgroups on the basis of information stored in the group information database 13. More specifically, when the connection control unit 14 is notified by the group management unit 12 of information that specifies terminals 20 for which switchover of the connection from a group to subgroups is to be performed and of information on content of switchover, it transmits a control message necessary for this purpose to the corresponding terminals 20 by way of the information transceiver unit 11.

The notifying unit 15 constitutes means for, when registration in the group information database 13 to the effect group communication is being performed is executed by the group management unit 12, providing notification to the terminals 20 belonging to the group performing the group communication of this and of group communication information. Notification is performed in response to the command of the group management unit 12 as described above. In addition, this notification is performed by way of the information transceiver unit 11. More specifically for example, this notification is performed by transmission of group communication information stored in the group management unit 12 by means of electronic mail. In addition to this, a barcode containing content corresponding to the group communication information may be generated and this barcode information transmitted to the terminals 20, or the notification may be based on the use of audio telephones. When a plurality of notification methods as described above are available, the notifying unit 15 selects a method determined in advance for, for example, each of the terminals 20, and performs the notification using this selected method. This describes the architecture of the group communication server 10.

The terminals 20 will be hereinafter described. The terminals 20 constitute the devices employed by the user connected to the mobile communication network N for executing mobile communication. More specifically for example, the terminals 20 are equivalent to mobile phone devices. Group communication can be performed between a terminal 20 and a plurality of other terminals 20 by connection therewith by way of the mobile communication network N. The terminals 20 comprise hardware such as a CPU, a memory and a communication module and, as described later, the function of the terminals 20 is executed by actuation of these constituent elements.

As shown in FIG. 1, the terminals 20 are configured to comprise an information transceiver unit 21, an information display unit 22, a terminal operating unit 23, a group control unit 24 and a communication control unit 25.

The information transceiver unit 21 constitutes means for transmitting information between one terminal 20 and other terminals 20 and the group communication server 10. This information transmission is performed by way of the mobile communication network N. The specific content of this transmitted and received information will be described later. The transmitted information is input from a terminal operating unit 23 or communication control unit 25 or the like as described later. The received information is output to an information display unit 22 or group control unit 24 or the like in response to this information.

The information display unit 22 constitutes means for outputting TV telephone data transmitted from another terminal 20 in a form that is perceptible to a user. The TV telephone data transmitted from another terminal 20 is received by the information transceiver unit 21 and then output to the information display unit 22. The TV telephone data output from the information display unit 22 constitutes image data and audio data and is output by a display and a speaker of the information display unit 22. In addition, the information display unit 22 outputs information to the effect that the group communication transmitted from the group communication server 10 is being performed. The information to the effect that group communication is being performed is received by the information transceiver unit 21 and then output to the information display unit 22. For example, when the information to the effect that group communication is being performed constitutes electronic mail data, this information is displayed in the display. The content displayed constitute, for example, as shown in FIGS. 3 to 5, group information, subgroup information and timing information. In addition, in conjunction with this information, information (information that indicates attributes of the users of the terminals 20) such as the name, age, gender, interests and occupation and so on of the users participating in the group communication transmitted from the group communication server 10 may be displayed.

The terminal operating unit 23 constitutes means for user input. The user input constitutes, for example, input of command information to the terminals 20 by a button operation or similar, input of audio data into a microphone, or input of image data for a TV telephone using a camera. Moreover, the button, microphone and camera are provided in the terminals 20. The input data pertaining to the TV telephone is output to the information transceiver unit 21 for transmission to another terminal 20 with which a TV telephone group communication is being performed.

In addition, when notification to the effect that group communication is being performed is received from the group communication server 10 as described above, it is possible for participation in group communication to occur only when there is input of this participation based on the user using the terminal operating unit 23 to input YES or NO to participation in the group communication. This input information is transmitted to the group communication server 10.

In addition, the user uses the terminal operating unit 23 to input that group communication is to be performed as well as group communication information such as group information corresponding thereto. This user of the terminal 20 performs this input when the user wishes to perform group communication. This input information is output to the group control unit 24. In addition, replacing subgroup information, the information input to the terminal operating unit 23 may be subgroup mode information. This allows the group communication server 10 to determine the terminals 20 belonging to the subgroups.

The group control unit 24 transmits group communication information such as the group information input into the terminal operating unit 23 to the group communication server 10 by way of the information transceiver unit 11. The input and transmission of the group communication information is performed in advance prior to the timing at which the group communication is performed.

The communication control unit 25 constitutes means for executing a connection processing when group communication is to be performed with other terminals 20 performing the group communication. This connection processing is executed on the basis of a control message transmitted from the group communication server 10. The control message is received by way of the information transceiver unit 21. This describes the architecture of the terminals 20.

Figure 6:
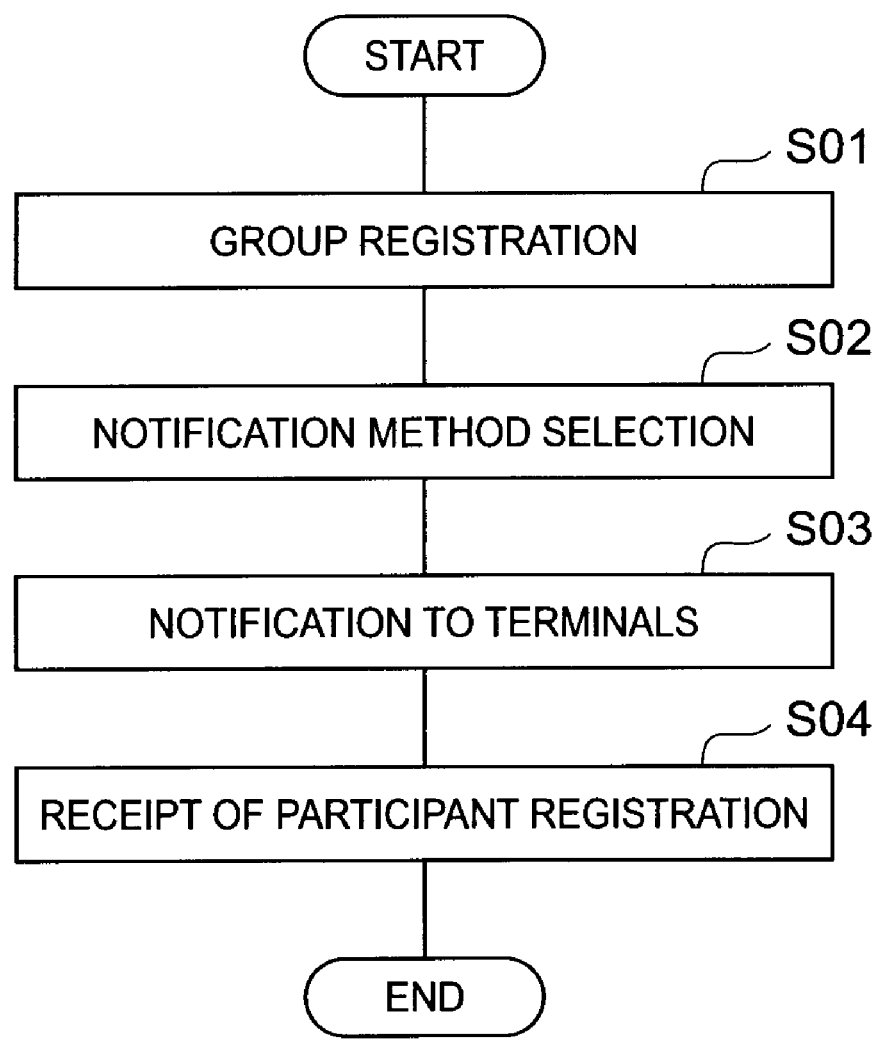
FIG. 6 is a flow chart of a processing executed by the group communication server of the embodiment of the present invention.
Figure 7:
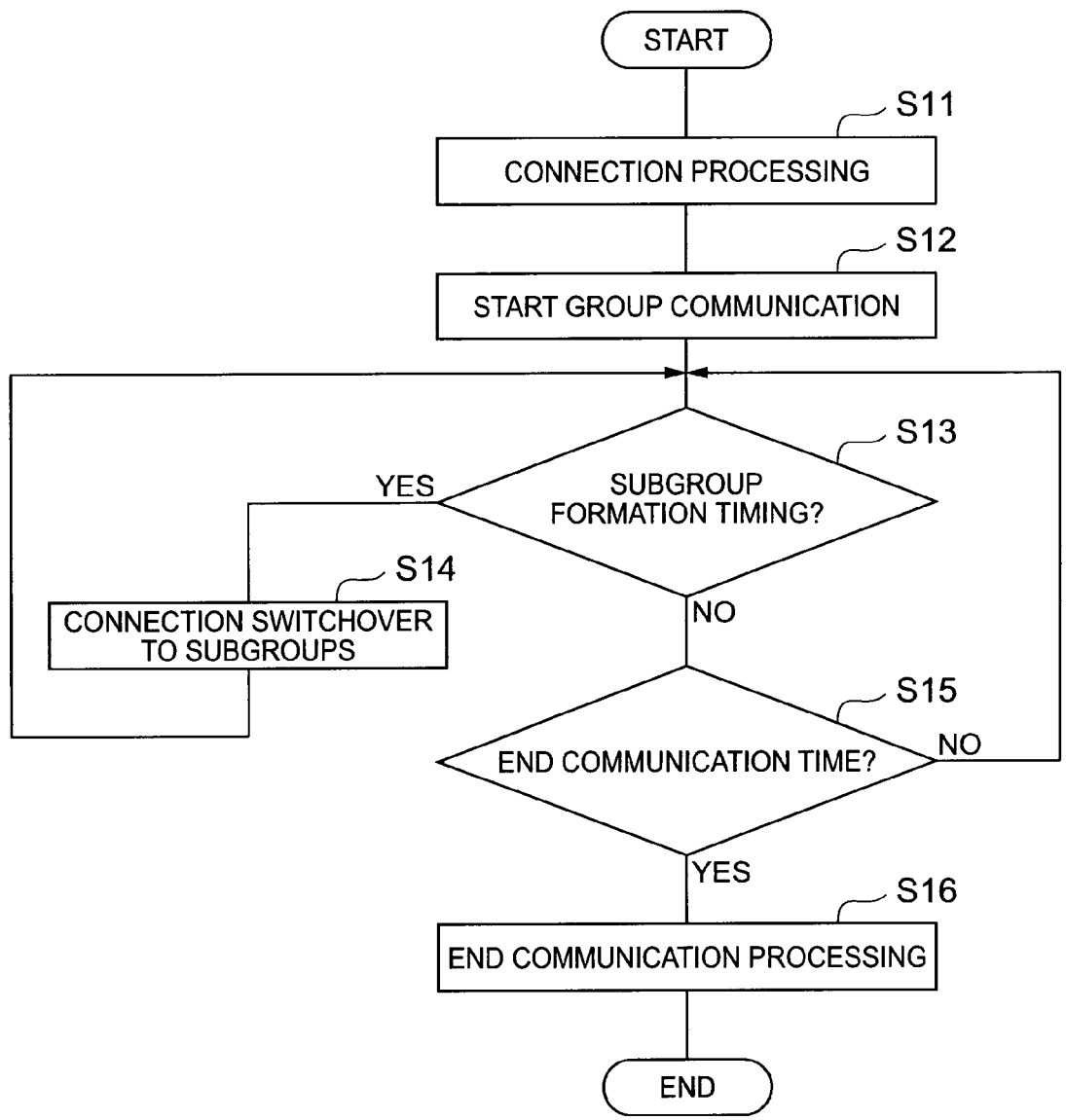
FIG. 7 is a flow chart of processing executed by the group communication server of the embodiment of the present invention.

The processing executed by the group communication server 10 of this embodiment will be hereinafter described with reference to the flow charts of FIGS. 6 and 7. This processing constitutes a processing that involves group communication by a group configured from a plurality of terminals 20, and then group communication between subgroups of this group. First, the processing prior to the group communication will be described with reference to the flow chart of FIG. 6, and then the processing during the group communication will be described with reference to the flow chart of FIG. 7.

First, in the group communication server 10, group communication information for performing group communication is received from the terminals 20 by way of the information transceiver unit 11 by the group management unit 12 and registered in the group information database 13 (S01). The group communication information input into the terminal operating unit 23 by the users using the terminals 20 is transmitted from the information transceiver unit 21 to the group communication server 10 by way of the group control unit 24. Here, when subgroup mode information instead of subgroup information is transmitted from the terminals 20, the terminals 20 from which the subgroups are to be configured are determined by the group management unit 12 which, based on this determination, generates subgroup information and performs a subgroup registration thereof in the group information database 13. The subgroup determination is arbitrarily selected and, for example, may be randomly selected.

In addition, the subgroup determination may be executed on the basis of rules stored in advance by referring to the user attributes of the information terminals 20 stored in the group information database 13. For example, when it is indicated in the subgroup mode information that a "1-to-1 type" group communication is to be performed a plurality of times, the subgroup is determined with reference to the "gender" attribute of the user to ensure that a different male-female pair is always established. Attributes other than "gender" such as "age" or "interests" may also be used as a reference.

Thereafter, in the group communication server 10, a command is issued from the group management unit 12 to the notifying unit 15 to provided notification to the terminals 20 belonging to the group that group communication is to be performed as well as the group communication information. The notification method is selected from one of either electronic mail, barcode or telephone by the notifying unit 15 receiving this command (S02). The selection of this notification method is based on reference to a notification method set in advance in, for example, each terminal 20, by the group communication server 10.

Thereafter, notification by the notifying unit 15 to the terminals 20 belonging to a group is performed by the selected notification method by way of the information transceiver unit 11 (S03). For example, when the electronic mail method is selected, an electronic mail containing information that group communication is to be performed as well as group communication information is transmitted to the terminals 20. This information is received by the information transceiver unit 21 of the terminals 20 to which the information of the above-noted notification has been transmitted, and is then output by the information display unit 22. At the terminals 20, YES or NO information regarding participation in the group communication pertaining to this notification is input into the terminal operating unit 23 by the users. This YES or NO information regarding participation input into the terminal operating unit 23 is transmitted to the group communication server 10 by way of the information transceiver unit 21.

In the group communication server 10, this YES or NO information regarding participation is received by the group management unit 12 by way of the information transceiver unit 11. The group management unit 12 registers this YES or NO information regarding participation for each terminal 20 in the group information database 13 (S04). The group management unit 12 executes a group communication processing only on those terminals 20 from which information indicating participation has been received.

Moreover, in the above-noted participation registration processing, when a terminal 20 (user) for which participation is not permitted is generated, notification may be provided to the original transmitting terminal 20 (owner) of the information that group communication is to be performed to enable the terminal 20 for which participation is not permitted to be altered to another terminal 20. This describes the processing executed prior to group communication being performed.

The processing executed when group communication is being performed will be hereinafter described with reference to the flow chart of FIG. 7. In the group communication server 10, the communication start time of the group communication timing information stored in the group information database 13 is monitored by the group management unit 12, and the connection processing for group communication is initiated when this start time is reached (S11). The connection processing is specifically executed as described below. The group management unit 12 acquires, from the group information of the group information database 13, information that specifies the terminals 20 belonging to the group pertaining to the group communication that is to be initiated, and issues a command to the connection control unit 14 to transmit a control message for establishing connection between these terminals 20. The control message pertaining to this command is transmitted to the terminals 20 by way of the information transceiver unit 11 from the connection control unit 14 that has received this command. The control message is received at the terminals 20 by the communication control unit 25 by way of the information transceiver unit 21. Thereafter, a connection processing with the terminals 20 performing the group communication is executed by the communication control unit 25 that has received this control message.

Moreover, the trigger for initiation of the group communication processing need not be the group communication server 10 as described above. For example, a communication start request may be transmitted to the group communication server 10 from the owner terminal 20, and the group communication processing may be initiated using this as the trigger. In addition, in the absence of a control message being received from the group communication server 10, an autonomous connection processing may be initiated by the terminals 20 belonging to the group.

When the connection between the terminals 20 belonging to the group ends, group communication is initiated between the terminals 20 by TV telephone (S12). Here, there may be times when the users of the terminals 20 wish to view the image screen of the TV telephones, and there may be times when they wish to know user information of a user of another terminal 20 of the group. For the latter, a user of a terminal 20 transmits to the group communication server 10 information requesting user information of a user of another terminal 20. In the group communication server 10 that receives this information, user information pertaining to the request is acquired by the group management unit 12 and is transmitted to the terminal 20.

The group communication is initially performed between all terminals 20 belonging to the group as indicated in the timing information (schedule) of FIG. 5. In the group communication server 10, referring to the timing information stored in the group information database 13, a judgment of whether or not a timing for switchover of the connection to the connection for performing group communication between the terminals 20 belonging to the subgroups is made by the group management unit 12 (S13). For example, as indicated in the example of the timing information shown in FIG. 5, a judgment of whether or not the times "19:40" and "20:30" and so on have been reached is made.

When the judgment is that these timings have been reached, a control to switchover and establish a connection that facilitates group communication between the subgroups is executed by the group communication server 10 (S14). In the same way as the processing for establishing connection for group communication, this control is executed on the basis of a control message in response to the subgroup information stored in the group information database 13 being transmitted from the group communication server 10 to the terminals 20. When the connection between the terminals 20 that belong to the subgroups is established, group communication based on the use of TV telephones is initiated between these terminals 20.

In addition, where subgroup mode information is transmitted from the terminals 20 to the group communication server 10 instead of subgroup information in S01, subgroup information generated by the group management unit 12 at this point may be registered in the group information database 13 and the subgroup formation performed on the basis of this information. In this case, an inquiry as to whether or not group communication is being performed between subgroups may be made to the terminals 20. Where a signal that indicates denial of group communication in the subgroup is transmitted from the terminals 20, the processing for forming subgroups may be ended. In addition, the timing of the transmission of the subgroup mode information to the group communication server 10 may occur during group communication.

Provided the group communication is continuing or provided the end timing of the group communication has not been reached, the above-noted processings (S13, S14) are repeated. Thereafter, in the group communication server 10, referring to the timing information stored in the group information database 13, a judgment is made by the group management unit 12 as to whether or not the timing at which group communication ends has been reached (S15).

When it is judged that the timing at which group communication ends has been reached, a control for ending the group communication is executed by the group communication server 10 (S16). This control is executed by transmission from the group communication server 10 to the terminals 20 of a control message for ending group communication. Moreover, the processing for ending group communication may be freely executed for each terminal 20. Based on this architecture, communication can be freely ended in accordance with the wishes of a user. This describes the processings performed during group communication.

As is described above, in the group communication server 10 pertaining to this embodiment, because connection of the subgroups is controlled on the basis of information such as subgroup information or timing information or the like stored in the group information database 13, the need for a user operation for the formation of a subgroup or the alteration to the terminals 20 belonging to a subgroup is eliminated. Accordingly, based on the group communication server pertaining to the present invention, communication between subgroups can be readily actualized with reduced trouble to the user in terms of subgroup formation and so on.

In addition, because of the inevitability of the subgroup formation based on this embodiment, it affords suitable communication in the communication required for matchmaking parties or the like. In addition, if notification of the terminals 20 belonging to the subgroups is omitted, a user will not know with whom they are in communication until group communication is initiated between the terminals 20 belonging to the subgroups whereupon, because of the enhanced sense of anticipation and so on felt by the user as a result, the pleasure associated with the communication can be increased.

In addition, if subgroup information and timing information are input into the group communication server 10 and registered in the group information database 13 as is the case in this embodiment, the user is able to register a subgroup and a timing in advance whereupon, in turn, the convenience of the communication performed between groups can be improved.

If the terminals 20 that belong to a subgroup are determined by the group communication server 10 as is the case in this embodiment, because there is no need for a user to set the terminals belonging to the subgroup, communication between subgroups can be readily actualized with even further reduced trouble to the user. In addition, it is possible for the users of the terminals 20 to be formed in unpredicted subgroups whereupon, because of the enhanced sense of anticipation and so on felt by the user as a result, the pleasure associated with the communication can be increased. In addition, if determining of these subgroups involves reference to user attributes, subgroups for which the object of a suitable communication system is better achieved can be formed.

In addition, while in the embodiment described above a single user (owner) registers all terminals 20 and group communication is performed between these terminals 20, an architecture based on merging these groups to form a new group may be adopted. That is to say, it is possible for a main group to be formed by merging a plurality of groups without need for a main group to be configured for each of the groups produced by the owner. Based on this architecture, group communication that allows many more users to participate than the number set by the user can be realized. For this merging of groups, for example, group attributes may be registered in the group communication server 10 in advance and groups having the same attributes merged on the basis of a control executed by the group communication server 10.

In addition, it is possible for arbitrary terminals 20 to participate in a group without need for the terminals 20 belonging to a group to be registered. Based on this architecture, connection between all the terminals 20 is possible without restriction on the terminals 20 participating in the group communication.

While in this embodiment group communication is performed by way of a mobile communication network N, the present invention may have application in communication networks other than a mobile communication network N. In addition, while in this embodiment the group communication involves the use of TV telephones, the group communication may be based on communication other than that involving the use of TV telephones such as, for example, audio communication or data communication (chat) or the like.

What is claimed is:

1. A group communication server for providing an intercommunication function between a plurality of terminals belonging to the same group, the group communication server comprising:
    a group information database for storing subgroup information that specifies terminals belonging to subgroups comprising two or more terminals of the plurality of terminals belonging to the group, connection mode information that indicates a connection type and a number of terminals in each subgroup, and timing information that indicates a timing for establishing connections by the specified connection type for intercommunication between terminals belonging to a subgroup; and
    control means for executing a control to switch connections between all the plurality of terminals belonging to the group to connections among terminals belonging to the respective subgroups specified by the subgroup information at a timing specified by the timing information stored in the group information database after connections between all the plurality of terminals belonging to the group are established.

2. The group communication server according to claim 1, further comprising registration means for receiving input of the subgroup information and the timing information for each terminal from the respective terminal and registering the two information items in the group information database.

3. The group communication server according to claim 1, further comprising:
    determination means for determining the two or more terminals belonging to each of the subgroups by receiving input of mode information that indicates the number of the subgroups and the number of terminals belonging to each of the respective subgroups, and registering this determined information in the group information database as the respective subgroup information.

4. The group communication server according to claim 3, wherein
    the group information database further stores information that indicates attributes of users of the terminals, and
    the determination means, referring to the attributes of the users of the terminals, determines which terminals belong to each subgroup on the basis of predetermined rules.

5. The group communication server according to claim 1, wherein the subgroup information constitutes information in which a terminal ID that specifies a terminal is associated with a subgroup ID that specifies a subgroup, and
    the group information database stores a group ID that specifies the group in association with the subgroup ID.

6. A group communication system, comprising:
    a group communication server according to claim 1; and
    at least one terminal configured for connection processing under control of the group communication server.

7. A group communication server providing an intercommunication function between a plurality of terminals belonging to the same group, the group communication server comprising:

a group information database storing subgroup information that specifies terminals belonging to subgroups comprising two or more terminals of the plurality of terminals belonging to the group, connection mode information that indicates a connection type and a number of terminals in each subgroup, and timing information that indicates a timing for establishing connections by the specified connection type for intercommunication between terminals belonging to a subgroup; and
   a controller executing control to establish connections among terminals belonging to respective subgroups specified by subgroup information at a timing specified by the timing information stored in the group information database by switching from previously established connections when connections are established between terminals belonging to subgroups different from the subgroups specified by the subgroup information of the plurality of terminals belonging to the group.

* * * * *